June 17, 1969
C. W. MILES
3,450,114
ENGINE VAPOR RECYCLING
Filed April 19, 1967
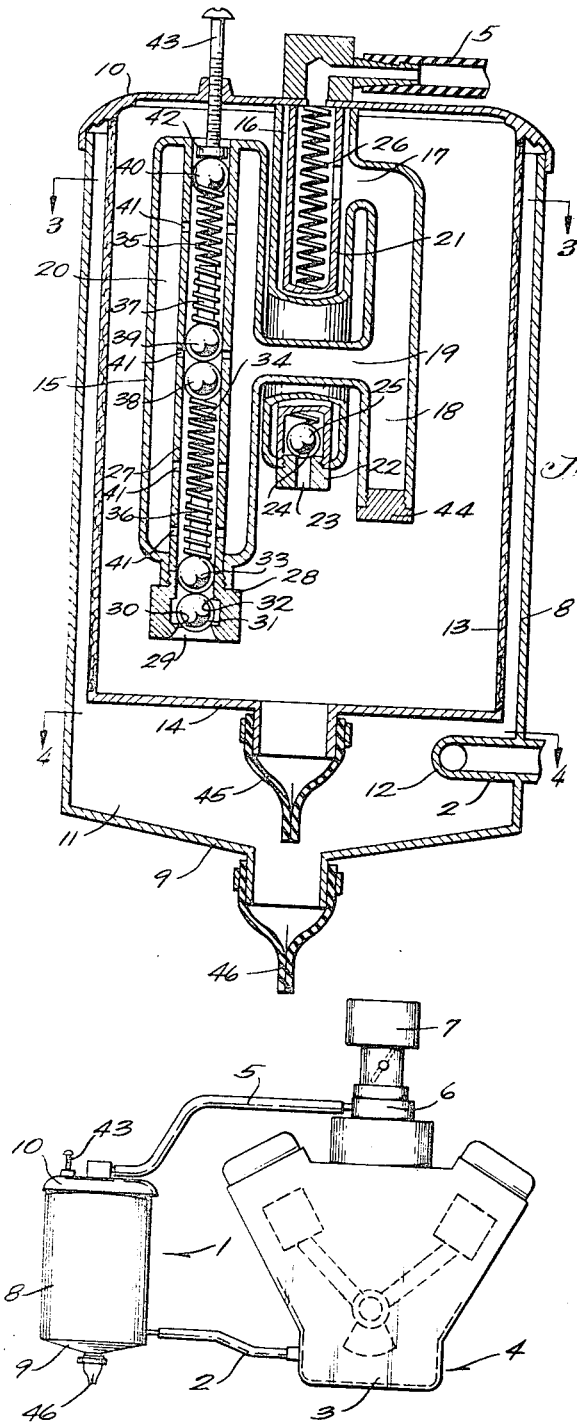
Fig. 2
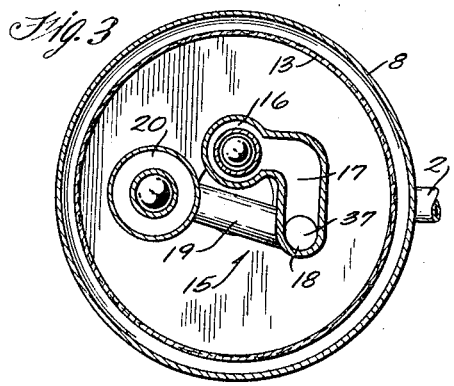
Fig. 3
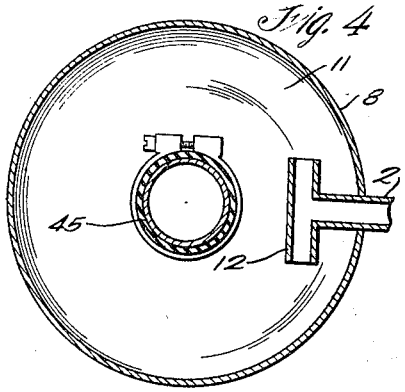
Fig. 4
Fig. 5
Fig. 1
Inventor
Cecil W. Miles
By Andrus & Starke
Attorneys United States Patent Office
3,450,114
Patented June 17, 1969

3,450,114
ENGINE VAPOR RECYCLING
Cecil W. Miles, Green Bay, Wis., assignor to Green Bay Research Corporation, Green Bay, Wis., a corporation of Wisconsin
Filed Apr. 19, 1967, Ser. No. 632,038
Int. Cl. F02m 25/06
U.S. Cl. 123—119     11 Claims

ABSTRACT OF THE DISCLOSURE

A device for treating engine crankcase gases to remove impurities and return the treated gases to the intake manifold. A cylindrical housing contains a filter which has therein a pair of pressure responsive valves. One valve permits discharge of treated gases at substantially all engine speeds, while the other valve opens for gas discharge only at above idle speeds. The latter valve includes a sleeve with a spring biased ball, and hot gases weaken the springs. Automatic one-way valves in the bottom of the device permit draining of sludge when the engine is off.

---

This invention relates to engine vapor recycling, and more particularly to a device for use in reducing the emission of undesirable smog-producing pollutants with the exhaust of an internal combustion engine.

Heretofore, it has been proposed to re-circulate blow-by gases from the engine crankcase back to the engine manifold, and in the process treat them to reduce their content of undesirable pollutants. See United States Patent 3,092,091 issued June 4, 1963 to T. W. Bosley.

The present invention is directed to an improvement on such previously known systems, which includes a filter device and automatic sludge drain valve means which is responsive to manifold vacuum. The filtered gases are permitted to return to the engine manifold through a valving arrangement which is responsive to manifold vacuum and also the temperature of the gases themselves.

The accompanying drawing illustrates the best mode presently contemplated by the inventor for carrying out the invention.

In the drawing:

FIGURE 1 is a schematic showing of an engine having the vapor recycling device connected thereto;

FIG. 2 is a central vertical section of the recycling device shown in FIGURE 1;

FIG. 3 is a transverse section taken on line 3—3 of FIG. 2;

FIG. 4 is a transverse section taken on line 4—4 of FIG. 2; and

FIG. 5 is a perspective view of one of the one way drain valves.

As shown generally in FIG. 1 of the drawing, the invention is embodied in a gas treatment device 1 which is connected through a suitable passage or conduit 2 to the sealed crankcase 3 of a conventional internal combustion engine 4. Similarly, device 1 is connected through a suitable passage or conduit 5 to the manifold 6 of engine 4. A carburetor 7 of any suitable design is mounted adjacent manifold 6.

Device 1 is adapted to receive polluted gases from crankcase 3 through conduit 2, treat them, and then discharge the treated gases through conduit 5 where they return to manifold 6. For this purpose, device 1 includes a cylindrical housing 8 having a bottom end or base 9 and a removable top end or cap 10. When cap 10 is secured in place, a closed chamber 11 is thereby formed. Conduit 2 extends into the lower portion of chamber 11 and discharges polluted gases thereinto, as through a port-like T-member 12.

To remove undesirable matter from the gases in chamber 11, filtration means are provided. For this purpose, a generally cylindrical hollow filter 13 having a bottom wall or floor 14 is disposed concentrically and generally coextensive within housing 8 in chamber 11, and may be suitably sealed at its upper edge to cap 10. Gases discharging under pressure from conduit 2 into chamber 11 may circulate below wall 14 and in the cylindrical space between housing 8 and filter 13, but are finally forced through the filter into the interior thereof.

Filter 13 may be made of any suitable well-known gas pervious material, such as expanded or crushed metal or fibrous matter, and serves as a primary filter to separate out a large percentage of the undesirable constituents of the gases. These constituents tend to condense and drain down both the inside and outside surfaces of the filter walls, and are subsequently removed as will be described.

In accordance with the invention, valve means responsive to the vacuum at the engine manifold 6 are provided to permit discharge of filtered gases back through conduit 5. For that purpose, a multi-chambered generally unitary housing 15 is disposed within filter 13 and may be suitably secured to cap 10. Housing 15 includes a generally centrally disposed vertical valve chamber 16 which is disposed so as to communicate through cap 10 to a discharge port and conduit 5. Chamber 16 is connected through a passage 17 to a vertical cleanout chamber 18, which in turn is connected through a passage 19 to a second vertical valve chamber 20.

Chamber 16 is provided with a pressure responsive valve which comprises an elongated tubular sleeve 21 which is closed at the lower end by a member 22 having a passage 23 therein which communicates with the interior of filter 13, and which forms a valve seat 24 for receipt of ball 25 which is biased thereagainst by a spring 26. Ball 25 is loosely mounted in sleeve 21 to permit gas to bypass it.

Similarly, chamber 20 is provided with a pressure responsive valve which includes an elongated tubular sleeve 27 which is closed at the lower end by a generally hollow member 28 having a passage 29 therein which communicates with the interior of filter 13 and which has a valve seat 30 for a valve ball 31. Stop means, such as an upper retaining interrupted shoulder 32 prevent ball 31 from escaping from member 28. A second ball 33 is disposed in the lower end of sleeve 27 and is biased into engagement with ball 31 by an arrangement comprising a plurality of axially disposed springs 34, 35, spring support member 36, 37; and balls 38, 39, 40. Balls 38 and 39 are disposed between springs 34 and 35 while ball 40 is mounted at the top of spring 35. Balls 33, 38, 39 and 40 are sealingly mounted against the wall of sleeve 27.

A plurality of openings 41 are disposed in the wall of sleeve 27, for purposes to be described. As shown, there may be more than one opening 41 at each level of sleeve 27, with each group of openings vertically spaced along the sleeve. The lowermost group of openings 41 is disposed at the lower end portion of sleeve 27, and just slightly above ball 33 when it is in the valve-closed position. Other groups of openings 41 are disposed intermediate the ends of each spring 34 and 35, and also between balls 38 and 39 in the valve-closed position.

In the particular embodiment shown the valve in chamber 16 comprises a low vacuum or pressure valve which opens at engine idle to discharge treated gases from the device. The vacuum or pressure at which valve ball 25 will be unseated can be varied by replacing spring 26 with a spring of different characteristics. Thus, at idle, ball 25 will raise off seat 24 and gases will be forced upwardly past ball 25 and through chamber 16 to discharge conduit 5 and hence back to manifold 6.

Likewise, the valve in chamber 20 comprises a high vacuum or pressure valve which opens at above engine idle. The vacuum or pressure at which valve ball 31 will be unseated can likewise be varied by replacing springs 34 and 35 with springs of different characteristics. In addition, a member 42 bears against the top of ball 40 and may be adjusted vertically, as by a screw 43 in cap 10, to change the compression of springs 34 and 35.

Assuming the engine is at idle and valve ball 25 unseated, if the engine throttle is actuated the manifold vacuum will temporarily drop to about 0, and ball 25 will seat. This is only an instantaneous reaction, however, and the vacuum will then increase substantially. Ball 25 will again unseat, but the restriction of passage 23 will cause increased pressure within the device and ball 31 will then unseat. Since gas can by-pass ball 31 and interrupted shoulders 32, it will cause ball 33 to be raised.

As soon as ball 33 has moved above lower openings 41, which act as a valve, gases will pass outwardly into chamber 20 and then through passage 19 to chamber 18, and hence through passage 17 to the interior of sleeve 21 and to conduit 5.

As the engine heats up with continuous high speed operation, it is desirable to decrease the resistance to gas flow through the valve mechanism for a given amount of manifold vacuum. For this purpose, the openings 41 above the raised ball 33 permit circulation of the hot gases into and through sleeve 27, where they intimately contact springs 34 and 35 and lessen their normal strength characteristics. Ball 33 will thus raise higher than previously, and will eventually be disposed above the second lowermost set of openings 41. Gases are thus free to pass outwardly into chamber 20 from the two lowermost sets of openings 41.

It has been found that, although filter 13 removes a large percentage of undesirable materials from the gases, a small amount of such materials remain in the filtered gases. Some of these remaining materials tend to condense out in the area of passage 17. They will then drain down inside chamber 18, and collect above a plug 44. Plug 44 may be manually removed from time to time for removal of the material.

Further in accordance with the invention, means are provided for automatic removal of the condensed-out material from the recycling device. For this purpose, a suitable flexible one-way pressure responsive valve 45 is disposed in floor 14 of filter 13, and a similiar valve 46 is disposed in base 9 of housing 8. Valves 45 and 46 are arranged so that suction thereabove will cause them to close, as when engine 4 is operating. Likewise, when engine 4 is off there will be no suction and the valves will open. Sludge and the like which is formed during engine operation will thus collect above valves 45 and 46 until the engine is shut off, at which time the valves open and the sludge will drain downwardly out of device 1, where it may be collected and/or disposed of in any suitable manner. Other one-way pressure responsive valves may be used without departing from the spirit of the invention.

The recycling device of the invention provides a unique system for treating exhaust engine gases so as to lessen the amount of pollutants discharged into the air. The device is relatively inexpensive to manufacture and maintain, and is usable on substantially all internal combustion engines. Tests with a device constructed in accordance with the invention and applied to a motor vehicle have resulted in separation of over six ounces of impurities in about 250 miles of driving. In some instances it may be desirable to eliminate the idle chamber 16 and associated valve, whereby all the gases pass through opening 29.

I claim:

1. In a device for treating and recycling engine exhaust gases:
    (a) a housing having a gas intake port and a gas discharge port,
    (b) a gas filter disposed within said housing between said ports,
    (c) and pressure responsive valve means disposed within said housing and connected to said discharge port for controlling passage of filtered gases to said latter port,
    (d) said valve means being positioned for contact by said filtered gases and being responsive to the temperature thereof to increase the flow of gases through the valve as the temperature of the gases increases,
    (e) said valve means being exposed to a first chamber having filtered gases therein and comprising:
        (1) a second chamber communicating with said discharge port,
        (2) first valve means between said chambers and operable in response to pressure thereon from said first chamber,
        (3) and second valve means between said first valve means and said second chamber and with said second valve means normally being closed to prevent communication between said chambers but being operable to provide such communication subsequent to opening of said first valve means.

2. In a device for treating and recycling engine exhaust gases:
    (a) a housing having a gas intake port and a gas discharge port,
    (b) a gas filter disposed within said housing between said ports,
    (c) and pressure responsive valve means disposed within said housing and connected to said discharge port for controlling passage of filtered gases to said latter port,
    (d) said valve means being positioned for contact by said filtered gases and being responsive to the temperature thereof to increase the flow of gases through the valve as the temperature of the gases increases,
    (e) said valve means being exposed to a first chamber having filtered gases therein and comprising:
        (1) a second chamber communicating with said discharge port,
        (2) a sleeve in said second chamber and with said sleeve communicating with said first chamber,
        (3) and normally closed first and second valve means disposed between the interior of said sleeve and said first and second chambers, respectively,
        (4) said first and second valve means being relatively disposed to provide opening of first said first valve means and then said second valve means due to gas pressure in said first chamber.

3. In the device of claim 2: stop means limiting the opening of said first valve means.

4. In the device of claim 2:
    (a) spring means disposed in said sleeve and biasing said first and second valve means toward normally closed position,
    (b) and means providing communication between said second chamber and said spring means to provide temperature responsiveness of valve operation.

5. The device of claim 4 wherein:
    (a) said sleeve and spring means extend vertically and with said first and second valve means being disposed at the lower end of the sleeve,
    (b) and said communication providing means comprises at least one opening in the wall of said sleeve above said first and second valve means.

6. In a device for treating and recycling engine exhaust gases:
    (a) a housing having a gas intake port and a gas discharge port,
    (b) a gas filter disposed within said housing between said ports,
    (c) and pressure responsive valve means disposed within said housing and connected to said discharge port for controlling passage of filtered gases to said latter port,
(d) said valve means being positioned for contact by said filtered gases and being responsive to the temperature thereof to increase the flow of gases through the valve as the temperature of the gases increases,
(e) said valve means being exposed to a first chamber having filtered gases therein and comprising:
   (1) a second chamber communicating with said discharge port,
   (2) first valve means disposed between said chambers and with said first valve means being responsive to substantially all ranges of pressures thereon from gases in said first chamber,
   (3) a third chamber communicating with said discharge port,
   (4) and second valve means disposed between said first and third chambers and with said second valve means being responsive to only the upper range of pressures thereon from gases in said first chamber,
(f) a fourth chamber disposed in said first chamber,
(g) said fourth chamber communicating with second and third chambers and positioned to receive condensed material from filtered gases passing toward said discharge port,
(h) and removable drain plug means between said fourth chamber and said first chamber.

7. In the device of claim 6:
(a) pressure responsive one-way valve means disposed in the lower portion of said housing,
(b) said one-way valve means being constructed to automatically close while gases flow between said ports and to automatically open when gases are not so flowing, to provide an automatic drain for foreign matter filtered from said gases by said filter and drained through said drain means.

8. In a device adapted to be connected between the sealed crankcase and manifold of an engine for treating and recycling the engine exhaust gases:
(a) a housing forming a first chamber having a gas intake port for connection to the said sealed crankcase, and having a gas discharge port for connection to the said manifold,
(b) and pressure responsive valve means disposed within said first chamber and connected to said discharge port and communicating with said intake port for controlling passage of exhaust gases to said discharge port,
(c) said valve means comprising:
   (1) a second chamber communicating with said discharge port,
   (2) first valve means disposed between said chambers and operable in response to pressure thereon from said first chamber,
   (3) and second valve means disposed between said first valve means and said second chamber and with said second valve means normally being closed to prevent communication between said chamber but being operable to provide such communication subsequent to opening of said first valve means.

9. The device of claim 8 which includes additional valve means connected between said first and second chambers and being responsive to exhaust gas pressure within said first chamber.

10. The device of claim 8 which includes a hollow gas filter disposed within said housing, and wherein said pressure responsive valve means is disposed within said hollow filter.

11. The device of claim 9 which includes a hollow gas filter disposed within said housing, and wherein all of said valve means are disposed within said hollow filter.

References Cited

UNITED STATES PATENTS

| | | |
|---|---|---|
| 1,427,337 | 8/1922 | Tracy. |
| 1,981,891 | 11/1934 | Woermann. |
| 2,056,762 | 10/1936 | Barr et al. _____ 123—196 |
| 2,194,274 | 3/1940 | Boyd. |
| 2,423,592 | 7/1947 | Foster. |
| 2,652,819 | 9/1953 | Nusbaum _____ 123—41.86 X |
| 3,118,435 | 1/1964 | Almquist. |
| 3,257,783 | 6/1966 | Baker et al. _____ 55—498 X |
| 3,307,336 | 3/1967 | Dewsberry _____ 137—525.1 X |
| 3,369,666 | 2/1968 | Hultgren et al. __ 137—525.1 X |

FOREIGN PATENTS 805,655  8/1936  France.

AL LAWRENCE SMITH, *Primary Examiner.*

U.S. Cl. X.R.
137—525.1; 55—510